United States Patent [19]

Tiede et al.

[11] 4,240,272
[45] Dec. 23, 1980

[54] ARCTIC CANTEEN

[75] Inventors: Herbert R. Tiede; Richard P. Pierzchala, both of Quantico, Va.

[73] Assignee: The United States of America as represented by the Secretary of the Navy, Washington, D.C.

[21] Appl. No.: 49,690

[22] Filed: Jun. 18, 1979

[51] Int. Cl.³ .............................................. F25D 3/08
[52] U.S. Cl. ...................... 62/457; 62/371; 215/13 R
[58] Field of Search ............. 62/529, 530, 371, 372, 62/457; 220/408, 411, 412; 215/13 R

[56] References Cited

U.S. PATENT DOCUMENTS

| | | | |
|---|---|---|---|
| 1,850,013 | 3/1932 | Hinkley | 220/412 |
| 1,952,026 | 3/1934 | Bennett | 62/371 |
| 2,068,384 | 1/1937 | Newport et al. | 62/372 |
| 2,185,799 | 1/1940 | Blake et al. | 62/457 |
| 2,575,283 | 11/1951 | Menrath | 220/411 X |
| 2,733,709 | 2/1956 | Sukacen | 126/262 |
| 2,767,563 | 10/1956 | Picascia | 62/372 |
| 2,773,358 | 12/1956 | Palmer et al. | 62/294 |
| 2,850,885 | 9/1958 | Mohr et al. | 62/372 |
| 2,954,891 | 10/1960 | Imber | 220/9 |
| 3,128,895 | 4/1964 | Nelle | 215/12 R |
| 3,178,903 | 4/1965 | Proctor | 62/457 X |
| 3,406,532 | 10/1968 | Rownd et al. | 62/457 |
| 3,561,424 | 2/1971 | Failla | 126/263 |
| 3,653,372 | 4/1972 | Douglas | 126/263 |
| 3,675,637 | 7/1972 | Trimble | 126/263 |
| 3,743,130 | 7/1973 | Jorgensen | 62/372 X |
| 3,807,194 | 4/1974 | Bond | 62/457 |
| 3,970,068 | 7/1976 | Sato | 126/263 |
| 3,978,233 | 8/1976 | Bolt | 426/115 |
| 4,002,235 | 1/1977 | Donnelly | 209/219 |
| 4,078,701 | 3/1978 | Clubb | 62/372 |

*Primary Examiner*—Lloyd L. King
*Attorney, Agent, or Firm*—R. S. Sciascia; Sol Sheinbein; L. E. Anderson

[57] ABSTRACT

A canteen system includes an insulated carrier, having a cavity in its interior for receipt of small chemical heating or cooling packets, and a metal container holding comestibles enveloped by the carrier. The container, when disposed in the carrier, sits in physical contact with a preselected activated packet, and as a result of its activation, the packet generates a thermal change within the carrier. The system design permits drinking of liquids in a conventional manner, as well as the insertion of eating utensils for soups and non-liquid foodstuffs.

14 Claims, 6 Drawing Figures

ARCTIC CANTEEN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to canteens, and more particularly to canteens designed for use in climatic extremes.

At the present time there are two canteens which have been deemed suitable for the use in military service. The most widely used canteen is made of plastic and can be used only to carry moderate temperature liquids. However, if the contents become frozen, this canteen cannot be quickly heated to effect a thawing or melting process without the canteen first suffering deformation at the very least, and more than likely, destruction. In addition, this canteen possesses a neck which is of such small diameter as to limit its use to pure liquids.

The other canteen used in military service is the ARCTIC canteen. This device is a double-walled, stainless steel vacuum bottle which has a round shape and a very narrow opening for filling or drinking. However, there are a number of significant limitations attendant with the use of this canteen. Firstly, because of the insulation, the canteen contents are difficult to thaw once they become frozen. Secondly, the canteen and its carrier are both poorly designed for use in extreme frigid climates inasmuch as the neck as very narrow and long, thereby facilitating rapid freezing of the contents, especially at the neck. Thirdly, the narrow neck renders the canteen difficult to refill and precludes using the canteen for carrying soups and semi-solid foods. Fourthly, the round configuration of this canteen prevents the user from setting it down without losing a substantial portion of the contents through spillage. Finally, this canteen is expensive to manufacture and displays no versatility regarding use in other climatic environments.

SUMMARY OF THE INVENTION

Accordingly, the canteen system of the present invention controls the temperature of the comestibles contained therein so that as a result of prolonged exposure to extreme ambient temperatures, impartation of excessive cold or heat to the comestibles is minimized. The canteen system includes a stainless steel container into which the comestibles may be poured and from which they may be eaten, an insulated carrier having top and bottom interfitting portions with at least one cavity in the bottom portion, a chemically exothermic or endothermic packet for placement in the cavity after its activation and a nylon insulated cover to assist attachment to the user's clothing. Assembly of the system includes activating a chemically exothermic or endothermic packet and placing it in the cavity in the insulated carrier, placing the container inside the insulated carrier, interfitting the top and bottom halves and placing the insulated carrier in the nylon insulated fabric cover for attachment to the user's clothing in a conventional manner.

OBJECTS OF THE INVENTION

It is therefore an object of the present invention to provide a canteen system designed for use in any climate, however extreme, to maintain the temperature of foods carried therein.

Another object is to provide a canteen system which includes a container insulated from the ambient and a chemically exothermic or endothermic generator for heating or cooling the contents of the container.

A further object is to provide a canteen system which permits easier filling and repeated use for solid, as well as liquid, comestibles.

Yet another object is to provide a container including a non-vacuum carrier which permits heating of the container in a stove or flame without damage to the carrier.

BRIEF DESCRIPTION OF THE DRAWINGS

Other objects and many of the attendant advantages of this invention will readily be appreciated as the same becomes better understood by reference to the following detailed description when considered in connection with the accompanying drawings in which like reference numerals designate like parts throughout the figures thereof and wherein.

DETAILED DESCRIPTION OF THE INVENTION

Figure 1:
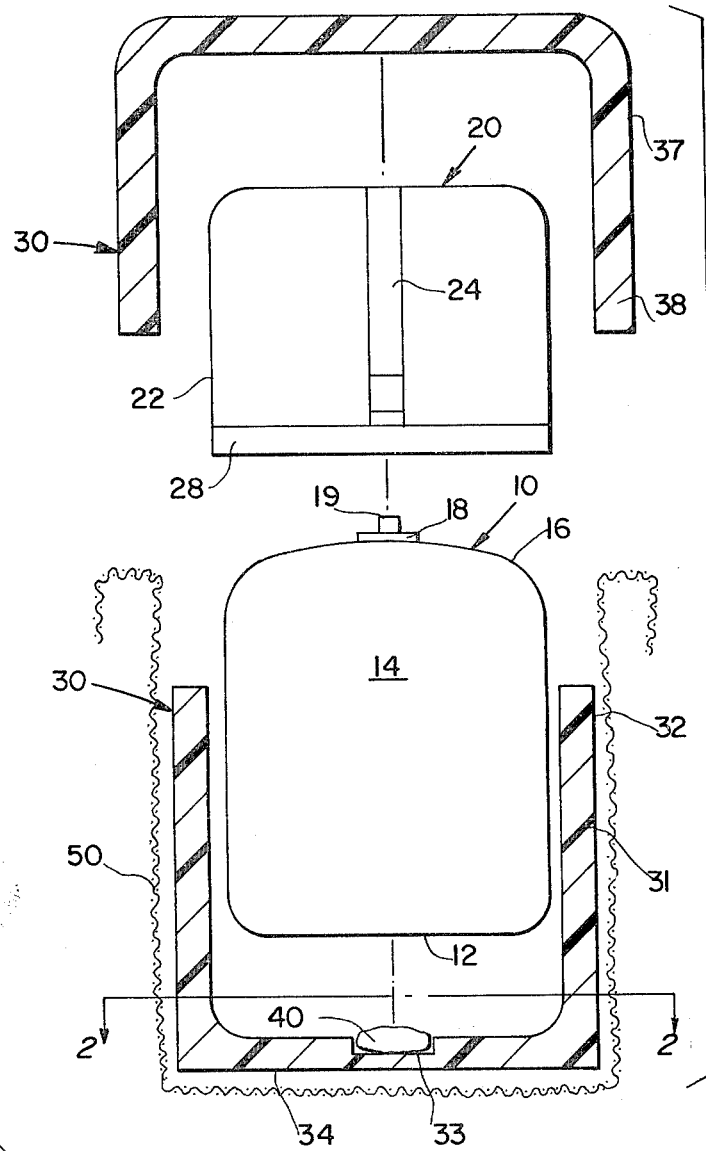
FIG. 1 is an exploded view of one embodiment of the canteen system of the present invention, shown partly in section.
Figure 2:
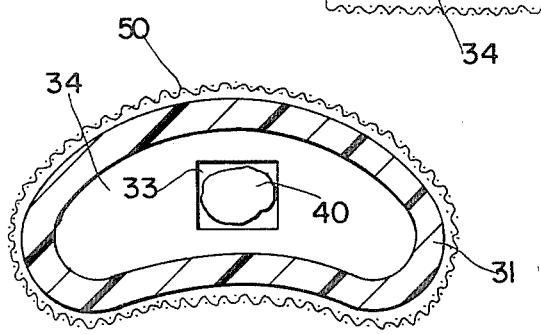
FIG. 2 is a view, partly in section, taken along section lines 2—2 of FIG. 1.

Referring now to the drawings wherein like characters and numerals designate like or corresponding parts throughout the several views, there is shown in FIGS. 1 and 2 a first embodiment of the canteen system which includes five principal components—a stainless steel container 10, a stainless steel cup 20, an insulated canteen carrier 30, a chemically exothermic or endothermic packet 40, and a nylon insulated cover 50.

Stainless steel container 10 (preferably of a one-quart capacity) includes bottom 12 and sidewalls 14. Bottom 12 is flat so that container 10 may be set down in an upright position on a substantially horizontal surface without spillage. Shoulders 16 are arcuate and define at their uppermost regions an opening of a large enough predetermined diameter to permit entry, into the container interior, of a conventional eating utensil. Cover 18 is removably affixed to the container opening preferably by a screw-threaded connection, and permits access to the opening's total diameter. Cover 18 also includes cap 19 of a smaller diameter than the opening diameter, so that drinking from the container is facilitated without removal of cover 18, and refilling may be accomplished without unnecessary spillage. Cap 19 is attached to cover 18 preferably by either a screw-threaded connection or a sealed friction fit connection. Another feature is that shoulders 16 do not terminate in a neck, but rather incorporate the opening as part of the continuum which comprises the upper part of the container, thus affording maximum protection against freezing in especially frigid environments.

At present there are two cups used with standard military issue canteens. One of these, stainless steel cup 20 is shown in FIG. 1, an includes body 22 which has an internal configuration slightly larger than the exterior of container 10, so that when the body is inverted as shown in FIG. 1, it may be slid over, and disposed on, container 10 in a storage position for later use. Handle 24, shown in a storage position hooked over the closed end of cup 20, is pivotally attached to the cup, in a conventional manner. The mouth of cup 20 is formed with rolled lip 28 so that the portion of the cup against which the user places his lips will be insulated from extreme temperature, as for example from the heat of the comestible in the cup.

The insulated carrier in which container 10 and cup 20 are carried, includes top portion 37 and bottom portion 31. Top portion 37 is designed to fit snugly over the open end of bottom portion 31 thereby providing a tight seal. A strong friction fit between the inner side of sidewall 38 of top portion 37 and the outer side of sidewall 32 of bottom portion 31 insures a secure interconnection. As also shown in FIG. 2, bottom portion 31 includes recess or cavity 33 located in bottom wall 34 of bottom portion 31 for receipt and positioning of chemically exothermic or endothermic packet 40 (to be described below). Both the top and bottom portions of the carrier are made of high impact-resistant plastic, and are lined with teflon-coated, polyurethane insulation to improve their capacity to resist heat transfer.

The sidewalls of the top and bottom portions of the carrier may also include complementary ribs and recesses for assuring a tight sealed interconnection. For example, either of top portion 37 or bottom portion 31 may include an annular recess into which an annular rib of the other interlockingly snap-fits. As another example, both the top and bottom portions may include annular ribs so that when the two portions are fitted together, the rib of the top portion deflects radially outwardly, over and around the rib of the bottom portion. In this way, the ribs interact to permit a snap-fit interconnection.

Chemically exothermic or endothermic packet 40, referred to above and shown in FIG. 1, is a self-contained, non-toxic, commercially available product, sold, for example by Chem-E-Watt Company located in Valley Stream, N.Y. These packets, which include at least one chemical in loose-fill, granular, solid form, are easily activated by the user, when needed, by intermixing by hand the contained chemicals. Where these chemicals are solids, the intermixture is simply accomplished by changing the shape of the packets. When activated, the exothermic or endothermic reactions are immediate and have been shown to last up to 24 hours. The purpose of the packets is to provide a heating or cooling effect, of such sufficiency as is needed, to maintain the temperature of the comestible contained within the stainless steel container 10 at a temperature above freezing or below boiling, respectively. Should the heating or cooling of the packets terminate before the desired result is achieved, the user merely removes the expired packet and replaces it with a newly activated packet.

Nylon insulated pouch or cover 50, made from the standard fabric used in all military pouches, is lined with lightweight foam insulation to provide additional insulation without adding any significant weight.

In use, when the user wants to impart heating or cooling to the contents of the container 10, the chemically exothermic or endothermic packet 40 is activated and positioned in recess 33 of carrier bottom portion 31 and container 10 placed in the bottom portion atop packet 40. After securing carrier top portion 37 to bottom portion 31, nylon cover 50 is fitted about bottom portion 31 and over top portion 37, and then is attached to the user's belt, jacket or other clothing in some conventional manner.

Figure 4:
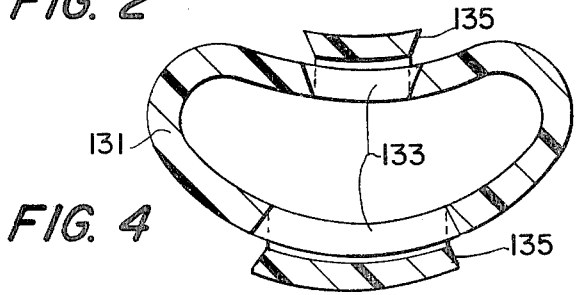
FIG. 4 is a view taken directly above the carrier of FIG. 3 looking downwardly.
Figure 3:
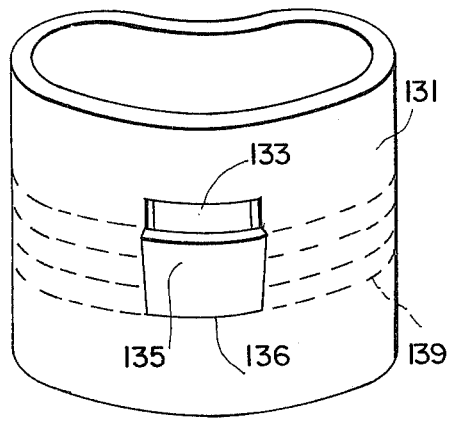
FIG. 3 illustrates an alternate form of the insulated canteen carrier.

FIGS. 3 and 4 illustrate an alternative embodiment of the bottom portion of the insulated carrier of the present invention wherein bottom portion 131 is shown to have its packet-receiving cavity 133 located in one of its major sidewalls. Door 135 is hinged to the sidewall along horizontal axis 136 so that the door pivots toward, and away from the sidewall. Removal of an areal portion of the sidewall, equivalent in size to door 135, results in the formation of cavity 133, the latter communicating the ambient with the interior of the insulated carrier. This embodiment contemplates the possibility of more than one cavity and door, as for example, one in each of the major sidewalls as illustrated in FIG. 4. Conventional sealing material is disposed around door 135 and the wall portion of cavity 133 which coacts with the door, so that when the door is closed with an activated exothermic or endothermic packet in the cavity, the cavity is sealed from the ambient and the temperature change effected by the packet is made optimally effective in the carrier bottom portion interior. If desired, the insulated carrier could also be made so that wires or other conductive paths 139 are imbedded in, and extend annularly about, the interior surface of the carrier. This feature would be most advantageous for the purpose of insuring that the effect of the temperature change is evenly distributed around the whole of the carrier interior, and would find its greatest utility where the maintenance of warm temperatures of comestibles in the stainless steel canteen, in an arctic environment, is desired.

As in the previous embodiment, when the user desires to heat or cool the contents of the container 10, a packet (exothermic or endothermic) is activated and placed in one or more of cavities 133.

Figure 5:
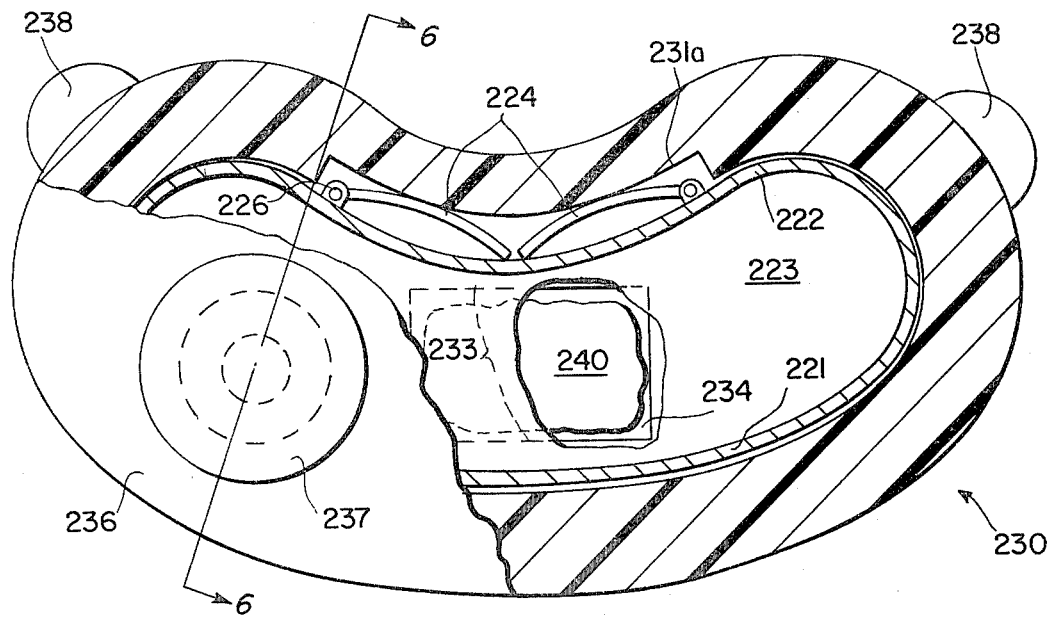
FIG. 5 is a view, partly in section, of another embodiment of the container and carrier.
Figure 6:
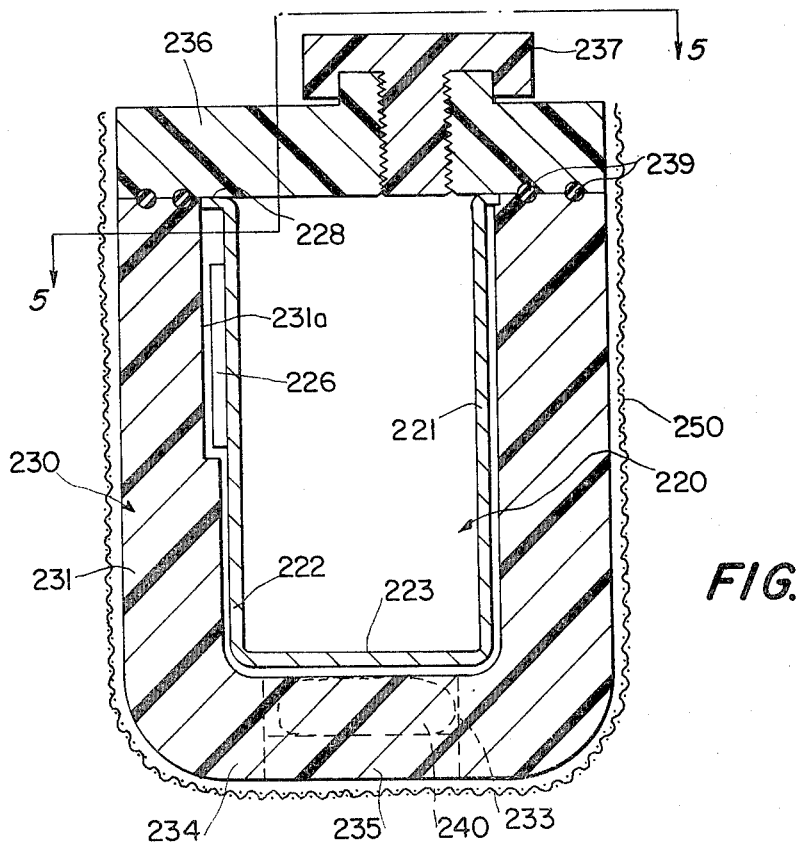
FIG. 6 is a view taken along section line 6—6 in FIG. 5.

FIGS. 5 and 6 disclose another embodiment of the present invention which includes insulated carrier 230 having top portion 236 and bottom portion 231, container 220, a chemically exothermic or endothermic packet 240 and nylon cover 250.

Container 220 is another type of standard issue canteen, and has an external configuration slightly smaller than the interior of insulated carrier 230. Container 220 comprises front wall 221, back wall 222 and bottom 223. Back wall 222 of container 220 includes along the middle portion thereof, two handles 224, folded, as shown in FIG. 5, to lie along back wall 222 when the cup is disposed inside bottom portion 231 of carrier 230, each handle being pivotally supported by hinge mounts 226. The mouth of container 220, as with cup 20 in FIG. 1, is formed with out-turned lip 228 for the same reasons, i.e. to provide protection for the user's lips against extreme temperatures of, and conducted by, the comestibles within container 220.

Insulated carrier 230 in which container 220 is carried, includes top portion 236 and bottom portion 231. Bottom portion 231 includes cavity 233 located in the bottom wall 234, for receipt and positioning of chemically exothermic or endothermic packet 240 (described above in connection with the FIGS. 1 and 2 embodiment) as well as door 235 for providing access to cavity 233.

Bottom portion 231 is also shown to include chamber 231a, which comprises a reduced thickness of the rear wall of bottom portion 231. This chamber is provided to accommodate handles 224 folded against cup back wall 222 when the cup is inserted within carrier bottom portion 231. Top portion 236 is perimetrically configured to lie directly over and completely cover, without any appreciable overlap, the open end of bottom portion 231 of the insulated carrier. As shown in FIGS. 5 and 6, top portion 236 is formed with an opening therethrough into which cap 237 may be inserted, the cap being fastened with, and to, the top portion at the opening in any desired manner, e.g. by screw threads, friction fit, snap detents, etc.

To insure the heating or cooling integrity of carrier 230, top portion 236 is designed to fit snugly over, and abut against the open end of bottom portion 231. To this end, O-rings 239 are seated in complementary configured grooves on the upper face of the bottom portion open end, and similarly configured grooves on the lower face of top portion 236 are provided to receive O-rings 239 so that when the top and bottom portions of carrier 230 are fitted together O-rings 239 become deformed, and a tight seal is effected. A secure attachment of the top and bottom portions, 236 and 231 respectively, of carrier 230, is insured with use of conventional latch devices such as those shown at 238 in FIG. 5, which act to move the top portion into abutment with the bottom portion such that after latching has been effected, the top and bottom portions are held together under pressure. While two latching devices have been illustrated in FIG. 5, any number may be employed, and their location may be chosen as desired.

Both the top portion 236 and the bottom portion 231 of the carrier are made of high impact-resistant plastic, and are lined with teflon-coated polyurethane insulation to improve its capacity to resist heat transfer.

Nylon insulated cover 50 is made from the standard fabric used in military pouches, and is lined with lightweight foam insulation to provide additional insulation without adding any significant weight.

In use, when the user wants to impart heating or cooling to the contents of container 220, a chemically exothermic or endothermic packet 240 may be activated and positioned in recess 233 of carrier bottom portion 231 and container 220 placed in the bottom portion atop the packet, substantially as set forth in connection with the embodiment of FIGS. 1 and 2. Packet 240, however, may also be inserted in cavity 233 by pivoting door 235 downward and away from bottom wall 234 to thereby open, and provide access to, cavity 233. An activated packet 240 is then merely inserted into the cavity from beneath the bottom wall 234 and door 235 is pivoted closed to lockingly retain the packet in the carrier cavity. In this way, when the heating or cooling capacity of packets expire, replacement, as needed, is accomplished by merely opening the door, dropping out the old packet, inserting a newly activated packet, and closing the door. Moreover, access to purely liquid comestibles within the container is facilitated through removal of cap 237 from top portion 236 of the carrier so the user can drink from the canteen in a conventional manner, whereas access to other types of comestibles, e.g. stews, hot foods, etc. is facilitated by removal of the carrier top portion 236 altogether, thereby permitting the insertion of eating utensils.

There has therefore been described a compact, portable and highly efficient canteen system for maintaining the temperature, of foodstuffs in a container, above or below a predetermined fixed temperature. The canteen system of the present invention is further advantageous inasmuch as it is inexpensive to manufacture, enables use in all climatic extremes, is easier to fill, can be used for solid foods as well as liquids, and permits removal of the metal container from the insulated carrier thereby enabling placement of the container in a heat source, e.g., a fire or a stove, to effect rapid thawing of the foodstuffs contained therein should they become frozen.

Obviously, many modifications and variations of the present invention are possible in the light of the above teachings. It is therefore understood that, within the scope of the appended claims, the invention may be practiced otherwise than as specifically described.

What is claimed is:

1. A portable canteen system for controlling the temperature of comestibles contained therein regardless of the ambient temperature, comprising:

a container for holding said comestibles, said container having an opening therein;

means for insulating said container from the ambient, said insulating means being cup-shaped and including side walls and a cover attached thereto; said insulating means including at least one cavity located in at least one of the side walls of said insulating means and including means for sealing each respective one of said at least one cavity from the ambient, said sealing means being pivotally attached to said respective sidewall of said insulating means at the location of said at least one cavity, said sealing means pivoting toward, and away from, said respective sidewall to make said at least one cavity inaccessible, and accessible, respectively, from the outside of said insulating means, means insertable within said at least one cavity for generating a thermal change within said insulating means, whereby when said sealing means is pivoted away from said outside of said insulating means, an actuated generating means may be inserted into said respective cavity and said sealing means pivoted back toward said outside of said insulating means, such that said generating means will be completely sealed from the ambient, and when said generating means is manually activated and placed within said at least one cavity and in physical contact, simultaneously, with both said at least one cavity and said container, a thermal change is effected within said insulating means.

2. A portable, thermally insulated canteen assembly for controlling the temperatures of comestibles contained therein regardless of the ambient temperature, comprising:

a fully enclosed container means for completely enclosing comestibles having a first cover which threadingly engages a first opening in said container means for allowing discharge of said comestibles; said first cover having smaller cap means in removable engagement therein for creating a smaller second opening in said container means within the periphery of said first cover;

cup means in surrounding removable engagement with said container means in an assembled mode and adapted to be used as a container to hold said comestibles in a disassembled mode;

first means for insulating said container means from the environment, said first insulating means being in removable surrounding relationship with said container means and being cup-shaped so as to enclose a first portion of said container means; said first insulating means having internal and external surfaces;

second means for insulating said container means from the environment, said second means being cup-shaped so as to removably, frictionally engage said first insulating portion to provide a tight seal so as to in conjunction with said first insulating portion substantially completely enclose said container means and thereby insulate said container means for the environment;

said first insulating means having recess means located on its internal surface accessible from its external surface and adapted to hold at least one packet for creating a chemical reaction which induces a temperature change to said container means;

means for attaching said canteen assembly to a human body;

whereby said canteen assembly may be carried in various climates without danger of freezing or heating its contents to extreme temperatures as said packet means may be inserted to effect the appropriate temperature adjustment.

3. The invention as claimed in claim 2 further including packet means for causing an exothermic reaction which transmits heat to said container means, said packet being in an inactive condition until said packet is activated by changing the shape of the packet.

4. The invention as claimed in claim 2 further including packet means for causing an enothermic reaction which removes heat from said container means, said packet being removable from said canteen assembly without moving or disrupting said comestibles, said packet being in an inactive condition until being activated by changing the shape of the packet.

5. The invention as claimed in claims 3 or 4 wherein said cup means further includes pivoting handle means for holding said cup means in upright fashion in said disassembled mode.

6. The invention as claimed in claims 2, 3 or 4 wherein said first insulating means has a horizontal cross-section including two generally narrowly rounded, oppositely disposed end sections, a first outwardly rounded arcuate section and a second generally inwardly rounded arcuate section opposite said first arcuate section whereby said generally inwardly rounded arcuate section is so shaped so as to allow comfortable placement adjacent the human body.

7. The invention as claimed in claim 6 wherein said container means, said cup means and said second insulating means have the same general configuration in cross-section as said first insulating means.

8. The invention as claimed in claims 2, 3 or 4 wherein said recess means includes packet receiving cavity means for receiving said at least one packet having at least one pivoting access door for removably insertion of said packet.

9. The invention as claimed in claim 7 wherein said first insulating means further includes conductive wires for evenly distributing the heat.

10. The invention as claimed in claim 2 wherein said means for attaching said container to a human body includes a fabric cover lined with insulation.

11. The invention as claimed in claim 8 wherein said at least one pivoting access door has sealing material disposed substantially around its periphery so that when said at least one door is closed with a packet in the cavity means, the cavity means is sealed from the ambient environment.

12. The invention as claimed in claim 11 wherein said first and second insulating means are made of high impact plastic and are lined with polytetroflouroethylene coated polyurethane insulation to improve their capacity to resist heat transfer.

13. A body carried canteen assembly comprising:

cup means for containing comestibles having in cross-section two generally semicircular ends and a first arcuate section intermediate said ends and being generally outwardly extending and a second arcuate section generally opposite said first arcuate section extending inwardly, said second arcuate section adapted to generally conform to the body of a human user;

a cup-shaped insulating means generally surrounding the surface of said cut means for insulating said cup means from the environment;

said cup-shaped insulating means having at least one recess means for receiving a packet for chemically inducing a temperature change to the interior of said cup means;

said recess means including door means in the external surface of the cup-shaped insulating means for sealing said recess means from the environment;

top insulating means in sealing relationship with said cup-shaped insulating means for sealing said cup means from the environment;

said top insulating means including cap means removable engagable with said top insulating means to provide an opening to said cup means to allow passage of said comestibles;

fabric means substantially surrounding said cup insulating means to attach said canteen assembly to a human body whereby said canteen assembly is adapted to be used in extremely hot or cold climates while substantially alleviating comestible freezing or spoilage.

14. The invention as claimed in claim 13 further including sealing means between said top insulating means and said cup-shaped insulating means including at least one O-ring.

* * * * *